United States Patent
Kulkarni et al.

(10) Patent No.: US 7,776,137 B2
(45) Date of Patent: *Aug. 17, 2010

(54) POLYIMIDE BASED MIXED MATRIX COMPOSITE MEMBRANES

(75) Inventors: Sudhir S. Kulkarni, Wilmington, DE (US); David J. Hasse, Bel Air, MD (US)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/408,382

(22) Filed: Mar. 20, 2009

(65) Prior Publication Data

US 2009/0178557 A1    Jul. 16, 2009

Related U.S. Application Data

(60) Division of application No. 11/192,518, filed on Sep. 16, 2005, now Pat. No. 7,527,673, which is a continuation-in-part of application No. 11/091,682, filed on Mar. 28, 2005, now abandoned.

(60) Provisional application No. 60/556,868, filed on Mar. 26, 2004.

(51) Int. Cl.
    *B01D 53/00* (2006.01)
(52) U.S. Cl. ................. 95/45; 96/10; 96/11; 55/DIG. 5; 521/27; 528/310
(58) Field of Classification Search ................. 95/45, 95/47–55; 96/4, 8, 10, 11, 13; 210/500.21, 210/500.23, 500.39; 55/DIG. 5; 521/27; 528/310
See application file for complete search history.

(56) References Cited

U.S. PATENT DOCUMENTS

| | | | | |
|---|---|---|---|---|
| 3,899,309 | A * | 8/1975 | Hoehn et al. | 95/54 |
| 4,071,590 | A * | 1/1978 | Strathmann | 264/45.1 |
| 4,113,628 | A * | 9/1978 | Alegranti | 210/500.23 |
| 4,440,871 | A | 4/1984 | Lok et al. | |
| 4,544,538 | A | 10/1985 | Zones | |
| 4,705,540 | A | 11/1987 | Hayes | |
| 4,717,393 | A | 1/1988 | Hayes | |
| 4,740,219 | A | 4/1988 | Kulprathipanja et al. | |
| 4,880,442 | A | 11/1989 | Hayes | |
| 4,925,459 | A | 5/1990 | Rojey et al. | |
| 4,925,562 | A | 5/1990 | te Hennepe et al. | |
| 4,983,191 | A * | 1/1991 | Ekiner et al. | 96/14 |
| 5,085,676 | A | 2/1992 | Ekiner et al. | |
| 5,127,925 | A | 7/1992 | Kulprathipanja et al. | |
| 5,178,650 | A * | 1/1993 | Hayes | 95/47 |
| 5,232,472 | A * | 8/1993 | Simmons et al. | 96/14 |
| 5,310,415 | A * | 5/1994 | Simmons et al. | 95/45 |
| 5,320,650 | A * | 6/1994 | Simmons | 96/14 |
| 5,334,697 | A * | 8/1994 | Simmons | 528/353 |
| 5,608,014 | A * | 3/1997 | Ekiner | 525/432 |
| 5,648,430 | A | 7/1997 | Chiodini et al. | |
| 5,716,430 | A * | 2/1998 | Simmons | 96/13 |
| 5,725,633 | A * | 3/1998 | Ozcayir et al. | 95/45 |
| 5,917,137 | A * | 6/1999 | Ekiner | 96/10 |
| 5,964,925 | A * | 10/1999 | Ozcayir et al. | 96/14 |
| 6,245,881 | B1 * | 6/2001 | Faure et al. | 528/353 |
| 6,425,944 | B2 * | 7/2002 | Faure et al. | 96/14 |
| 6,497,747 | B1 * | 12/2002 | Ding et al. | 95/45 |
| 6,508,860 | B1 | 1/2003 | Kulkarni et al. | |
| 6,626,980 | B2 | 9/2003 | Hasse et al. | |
| 6,663,805 | B1 | 12/2003 | Ekiner et al. | |
| 6,730,145 | B1 * | 5/2004 | Li | 96/10 |
| 6,790,263 | B1 * | 9/2004 | Ding et al. | 96/13 |
| 7,018,445 | B2 * | 3/2006 | Simmons et al. | 95/51 |
| 7,025,804 | B2 * | 4/2006 | Simmons et al. | 95/51 |
| 7,250,545 | B2 | 7/2007 | Roman et al. | |
| 2005/0230305 | A1 * | 10/2005 | Kulkarni et al. | 210/500.23 |
| 2006/0117949 | A1 * | 6/2006 | Kulkarni et al. | 95/45 |
| 2006/0196355 | A1 * | 9/2006 | Ekiner et al. | 95/45 |
| 2007/0199445 | A1 * | 8/2007 | Kulkarni et al. | 95/45 |

OTHER PUBLICATIONS

Ashtekar, et al., "Small-Pore Molecular Sieves SAPO-34 and SAPO-44 with Chabazite Structure: A Study of Silicon Incorporation," J. Phys. Chem. 1994, 98, pp. 4878-4883.

\* cited by examiner

*Primary Examiner*—Duane Smith
*Assistant Examiner*—Sonji Turner
(74) *Attorney, Agent, or Firm*—Patricia E. McQueeney

(57) ABSTRACT

A polyimide MMC membrane useful for the production of oxygen-enriched air or nitrogen-enriched-air, for the separation of carbon dioxide from hydrocarbons or nitrogen, and the separation of helium or hydrogen from various streams. Membranes of polyimide polymers, such as polyimide polymers sold under the tradename P-84, are mixed with molecular sieve materials, such as SSZ-13, to make MMC membranes. The MMC membranes of the invention provide improved membrane performance compared to polymer only membranes, particularly when used to form asymmetric film membranes or hollow fiber membranes. The MMC films exhibit consistent permeation performance as dense film or asymmetric membranes, and do not interact with components of the process streams, such as organic solvents. The membranes of the invention exhibit particularly surprisingly good selectivity for the fluids of interest.

20 Claims, No Drawings

POLYIMIDE BASED MIXED MATRIX COMPOSITE MEMBRANES

CROSS-REFERENCE TO RELATED APPLICATIONS

This application is a divisional of and claims benefit of U.S. application Ser. No. 11/192,518, filed Sep. 16, 2005, entitled "Novel Polyimide Based Mixed Matrix Composite Membranes," which is a continuation-in-part and claims benefit of U.S. application Ser. No. 11/091,682, filed Mar. 28, 2005, entitled "Novel Polyimide Based Mixed Matrix Membranes," now abandoned, which claims benefit of U.S. Provisional Application No. 60/556,868, filed Mar. 26, 2004, entitled "Polyimide Based Mixed Matrix Membranes." The entire content of each application is hereby incorporated by reference.

BACKGROUND

This invention relates to fluid separation membranes incorporating a molecular sieve material dispersed in a polymer.

The use of selectively gas permeable membranes to separate the components of gas mixtures is commercially very important art. Such membranes are traditionally composed of a homogeneous, usually polymeric, composition through which the components to be separated from the mixture are able to travel at different rates under a given set of driving force conditions, e.g. transmembrane pressure, and concentration gradients.

A relatively recent advance in this field utilizes mixed matrix composite (MMC) membranes. Such membranes are characterized by a heterogeneous, active gas separation layer comprising a dispersed phase of discrete particles in a continuous phase of a polymeric material. The dispersed phase particles are microporous materials that have discriminating adsorbent properties for certain size molecules. Chemical compounds of suitable size can selectively migrate through the pores of the dispersed phase particles. In a gas separation involving a mixed matrix membrane, the dispersed phase material is selected to provide separation characteristics that improve the permeability and/or selectivity performance relative to that of an exclusively continuous phase polymeric material membrane.

U.S. Pat. Nos. 4,740,219, 5,127,925, 4,925,562, 4,925,459, 5,085,676, 6,508,860, 6,626,980, and 6,663,805, which are not admitted to be prior art with respect to the present invention by their mention in this background, disclose information relevant to mixed matrix composite membranes. U.S. Pat. Nos. 4,705,540, 4,717,393, 4,880,442, and U.S. Patent Publication Nos. 20040107830 and 20040147796, which are not admitted to be prior art with respect to the present invention by their mention in this background, disclose polymers relevant to permeable gas is separation membranes. However, these references suffer from one or more of the disadvantages discussed herein.

Permselective membranes for fluid separation are used commercially in applications such as the production of oxygen-enriched air, production of nitrogen-enriched-air for inerting and blanketing, separation of carbon dioxide from methane or nitrogen, and the separation of helium from various gas streams. It is highly desirable to use membranes, such as MMC membranes, that exhibit good permeabilities, and good permselectivities in these applications. It is particularly desirable to use asymmetric membranes in these applications. It is also desirable to produce MMC membranes that exhibit consistent permeation performance. However, some polymers do not provide improved MMC membrane performance when used to form asymmetric membranes. Furthermore, some polymers have shown to exhibit an interaction with components of the process streams, such as organic solvents, that can result in the loss of performance due to plasticizing the membrane or other problems.

It remains highly desirable to provide a mixed matrix gas separation membrane having molecular sieve material dispersed in a continuous polymer matrix that yield improved permeation performance, particularly when making asymmetric membranes. It is also desirable that MMC membranes of any form show a consistent permeation performance. Finally, it is desirable to maintain permeation performance after exposure to gas mixtures with aggressive process compositions, such as compositions containing organic solvents or contaminants.

SUMMARY

The MMC membranes of the invention satisfy the need to have mixed matrix membranes that provide improved membrane performance compared to polymer-only membranes, particularly when used to form asymmetric film mixed matrix membranes, exhibit consistent permeation performance, and do not interact with components of the process streams, such as organic solvents. The membranes of the invention exhibit surprisingly good selectivity for the fluids of interest, provide surprisingly consistent separation performance, and provide surprisingly improved separation performance as asymmetric membranes.

The present invention provides a membrane for fluid separation containing a molecular sieve material dispersed in a continuous phase of a polyimide polymer. The polyimide polymer comprises a number of first repeating units of formula (I), described below.

The first repeating units of the polyimide polymer are of a formula (I):

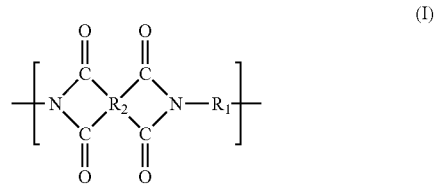

In formula (I), $R_1$ is a molecular segment of a formula (A), formula (B), formula (C), or mixtures of formula (A), formula (B), and formula (C), where formula (A), formula (B), and formula (C) are:

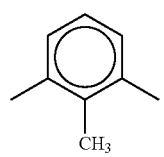

-continued

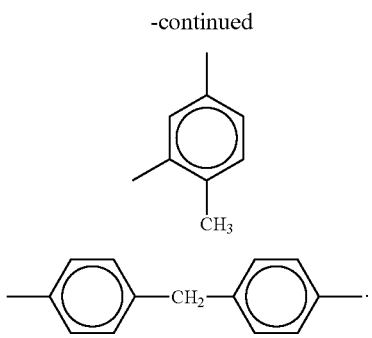

(B)

(C)

Furthermore, in formula (I), $R_2$ is a molecular segment of a formula (Q), formula (S), formula (T), or mixtures of formula (Q), formula (S), and formula (T), where formula (Q), formula (S), and formula (T) are:

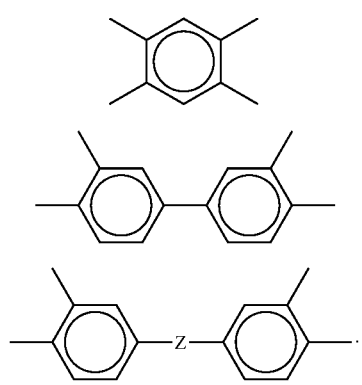

(Q)

(S)

(T)

In formula (T) above, Z is a molecular segment of a formula (L), formula (M), formula (N), or mixtures of formula (L), formula (M), and/or formula (N), where formula (L), formula (M), and formula (N) are:

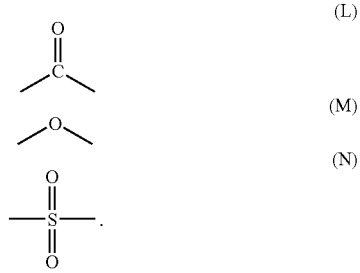

(L)

(M)

(N)

The polyimide polymer is typically, but not necessarily, a polyimide polymer sold under the tradename P84, P84HT, or mixtures thereof.

The molecular sieve materials may be, but are not limited to, CHA type molecular sieves, particularly aluminosilicate molecular sieve, silicalite molecular sieve, silico-alumino-phosphate molecular sieve, alumino-phosphate molecular sieve, carbon-based molecular sieve, and mixtures thereof. Of particular interest of molecular sieve materials, known as SSZ-13, SAPO-34, and SAPO-44.

The current invention also provides a process for producing a fluid separating membrane and the product produced by the process includes the actions of:
(a) providing a polyimide polymer comprising a number of first repeating units of formula (I), as described above;
(b) providing a molecular sieve material;
(c) synthesizing a concentrated solution, wherein the concentrated solution comprises a solvent, the polyimide polymer, and the molecular sieve material; and
(d) forming a membrane.

Furthermore, this invention includes a method of separating one or more fluids from a fluid mixture comprising the actions of:
(a) providing a fluid separation membrane of the current invention;
(b) contacting a fluid mixture with a first side of the fluid separation membrane thereby causing a preferentially permeable fluid of the fluid mixture to permeate the fluid separation membrane faster than a less preferentially permeable fluid to form a permeate fluid mixture enriched in the preferentially permeable fluid on a second side of the fluid separation membrane, and a retentate fluid mixture depleted in the preferentially permeable fluid on the first side of the fluid separation membrane, and
(c) withdrawing the permeate fluid mixture and the retentate fluid mixture separately.

These and other features, aspects, and advantages of the present invention will become better understood with regard to the following description, and appended claims.

DESCRIPTION OF PREFERRED EMBODIMENTS

The present invention provides a mixed matrix composite (MMC) membrane for fluid separation with surprisingly superior separation performance characteristics. The MMC membrane of the current invention uses a molecular sieve material and a polyimide polymer. The polyimide polymer used to make MMC membranes of the current invention contains a number of first repeating units of formula (I), which is described below. Furthermore, the present invention includes a method of producing a MMC membrane for fluid separation using the polyimide polymer of the current invention, and a process of using the membrane for fluid separation.

As used in this application, "mixed matrix composite membrane" or "MMMC membrane" refers to a membrane that has a selectively permeable layer that comprises a continuous phase of a polymeric material and discrete particles of adsorbent material uniformly dispersed throughout the continuous phase. These particles are collectively sometimes referred to herein as the "discrete phase" or the "dispersed phase". Thus the term "mixed matrix" is used here to designate the composite of discrete phase particles dispersed within the continuous phase.

As used in this application, a "repeating unit" refers to a molecular segment in the polymer chain backbone that repeats itself regularly along the polymer chain. In this respect, the term repeating units is meant to cover all portions of such polymers and any number of the repeating units.

As used in this application, "P84" or "P84HT" refers to polyimide polymers sold under the tradenames P84 and P84HT respectively from HP Polymers GmbH.

As used in this application, "Ultem" or "Ultem 1000" refers to a polyetherimide polymer sold under the trademark Ultem®, manufactured by GE Plastics, and available from GE Polymerland.

As used in this application, "Matrimid®" refers to a line of polyimide polymers sold under the trademark Matrimid® by Huntsman Advanced Materials. "Matrimid® 5218" refers to a particular polyimide polymer sold under the trademark Matrimid®.

As used in this application, "SSZ-13" refers to an aluminosilicate molecular sieve material prepared as disclosed in U.S. Pat. No. 4,544,538, entitled "Zeolite SSZ-13 And Its Method of Preparation," the entire disclosure of which is hereby incorporated by reference.

The present invention provides a mixed matrix composite (MMC) membrane for fluid separation comprising a polyimide polymer and a molecular sieve material. The continuous phase of the mixed matrix membrane consists essentially of the polymer. By "consists essentially of" is meant that the continuous phase, in addition to polymeric material, may include non-polymer materials that do not materially affect the basic properties of the polymer. For example, the continuous phase can include preferably small proportions of fillers, additives and process aids, such as surfactant residue used to promote dispersion of the molecular sieve material in the polymer during fabrication of the membrane.

The polyimide polymer for MMC membranes of the current invention, include a number of first repeating units of formula (I):

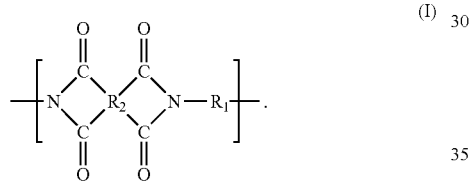
(I)

In formula (I), $R_1$ is a molecular segment of a formula (A), formula (B), formula (C), or mixtures of formula (A), formula (B), and formula (C), where formula (A), formula (B), and formula (C) are:

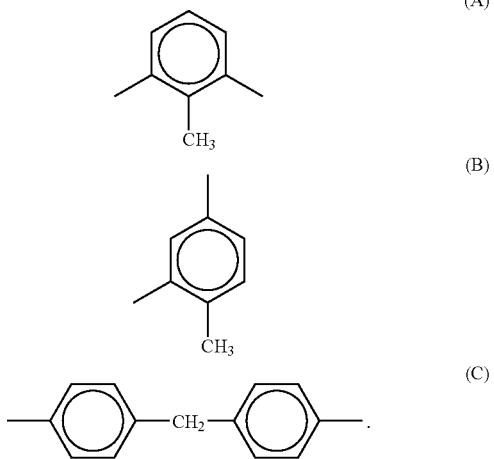

(A)

(B)

(C)

Furthermore, in formula (I), $R_2$ is a molecular segment of a formula (Q), formula (S), formula (T), or mixtures of formula (Q), formula (S), and formula (T), where formula (Q), formula (S), and formula (T) are:

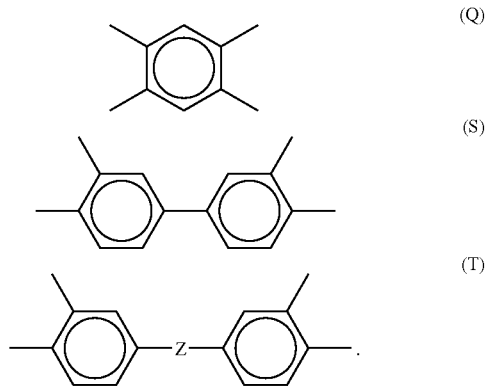

(Q)

(S)

(T)

In formula (T) above, Z is a molecular segment of a formula (L), formula (M), formula (N), or mixtures of formula (L), formula (M), and/or formula (N), where formula (L), formula (M), and formula (N) are:

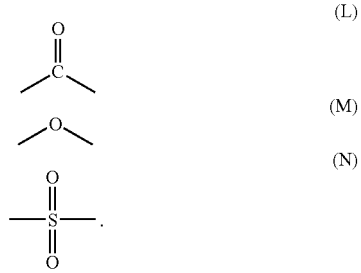

(L)

(M)

(N)

Referring to the polyimide polymer discussed above, the first repeating units may alternately be of a formula (Ia), where formula (Ia) is:

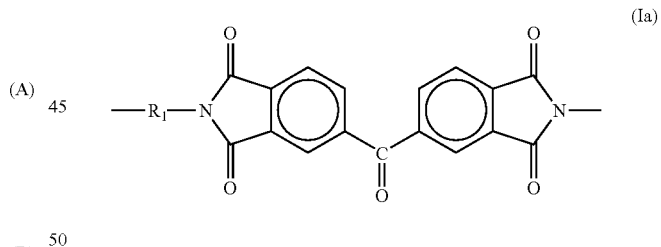
(Ia)

In formula (Ia), $R_1$ is a molecular segment having a composition of formula (A), formula (B), or formula (C), or a mixture of formula (A), formula (B), or formula (C) in the first repeating units and where formula (A), formula (B), and formula (C) are those described above.

In another alternate embodiment of formula (Ia), the $R_1$ in formula (Ia) has a composition of formula (A) in about 10 to about 25% of the first repeating units, formula (B) in about 55 to about 75% of the first repeating units, and formula (C) in about 20 to about 40% of the first repeating units.

In another alternate embodiment of formula (Ia), the molecular segment $R_1$ has a composition of formula (A) in about 16% of the first repeating units, formula (B) in about 64% of the first repeating units, and formula (C) in about 20% of the first repeating units.

Again referring to the polyimide polymer, the first repeating units may alternately be of a formula (Ib), shown below:

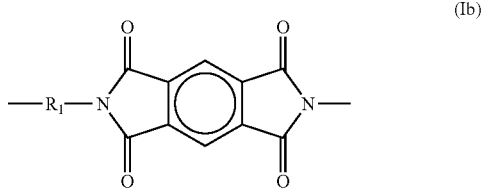

(Ib)

In formula (Ib), $R_1$ is a molecular segment having a composition of formula (A), formula (B), or mixtures of formula (A) and formula (B) in the first repeating units where formula (A), and formula (B) are described above.

Again referring to the polyimide polymer, the first repeating units may alternately be of formula (Ia), and/or formula (Ib), wherein formula (Ia) and formula (Ib) are described above.

In preferred membranes of the current invention, the polyimide polymer makes up about 20-80% of the membrane by weight (wt %). In one preferred embodiment, membranes are produced from a polyimide polymer belonging to the family of polyimide polymers sold under the tradenames P84, P84HT, or mixtures thereof. The polyimide polymers may be used to produce membranes in forms that are highly desirable. One preferred membrane form is an asymmetric film membrane. Another preferred membrane form is a hollow fiber membrane.

Other components can be present in the polymer such as, processing aids, chemical and thermal stabilizers and the like, provided that they do not significantly adversely affect the separation performance of the membrane.

The polyimide polymers are a suitable molecular weight to be film forming and pliable so as to be capable of being formed into continuous films or membranes. Alternatively, the polyimide polymers are a suitable molecular weight to be spun by known techniques into hollow fiber membranes. The polyimide polymers of this invention preferably, but not necessarily, have an inherent viscosity within the range of about 0.45 to about 0.65 deciliters/gram (dl/gm), more preferably about 0.50 to about 0.62 dl/gm, and even more preferably about 0.54 to about 0.65 dl/gm.

In one preferred embodiment, the polyimide polymer used to make the mixed matrix membrane of the current invention is an annealed polyimide polymer. Annealed polyimide polymers, as used herein, are polyimide polymers treated by an annealing process as described in U.S. Pat. No. 7,422,623, entitled "Improved Separation Membrane by Controlled Annealing of Polyimide Polymers," the entire disclosure of which is hereby incorporated by reference.

The dispersed phase of the membrane contains a molecular sieve material that has particular separation characteristics of flux and selectivity with respect to the components of a given gas mixture. These characteristics are largely determined by such factors as the effective pore size and framework structure. The molecular sieve separation characteristics can be chosen to be different from those of the continuous phase polymer. Usually, the separation characteristics of the molecular sieve material are selected so that overall separation performance through the mixed matrix membrane is enhanced relative to performance through a homogenous membrane of the continuous phase material. For example, a selectively gas permeable polymer might have a high flux but low selectivity in relation to a specific mixture of gases. A molecular sieve material having high selectivity for the same gases can be dispersed in the continuous phase of such polymer to produce a mixed matrix membrane having a superior combination of selectivity and flux.

The molecular sieve particle size should be small enough to provide a uniform dispersion of the particles in the suspension from which the mixed matrix membrane will be formed and also to obtain uniform distribution of the dispersed phase particles in the continuous phase of the mixed matrix membrane. The median particle size should be less than about 10 μm, preferably less than 3 μm, and more preferably less than 1 μm. Large agglomerates should be reduced to less than about 10 μm and preferably less than about 3 μm. Very fine molecular sieve particles may be made by various techniques such as by choosing appropriate synthesis conditions or by physical size reduction methods well known to those of ordinary skill in the art, such as ball milling, wet-milling, and ultrasonication.

One preferred molecular sieve material used in the mixed matrix membrane of the current invention is described in U.S. Pat. No. 6,626,980, entitled "Mixed Matrix Membranes Incorporating Chabazite Type Molecular Sieves," which is fully incorporated herein by this reference. This type of molecular sieve material is iso-structural with the mineral zeolite known as chabazite. That is, they are characterized by the chabazite framework structure designated as CHA by *Atlas of Zeolite Structure Types*, W. M. Meier, DH Olson and Ch. Baerlocher, Zeolites 1996, 17 (A1-A6), 1-230 (hereinafter "IZA"). This molecular sieve type derives its name from the structure of a naturally occurring mineral with the approximate unit cell formula $Ca_6Al_{12}Si_{24}O_{72}$. The chabazite type (CHA) molecular sieves are distinguished by channels based on 8-member rings with about 3.8 Å×3.8 Å (0.38 nm×0.38 nm) dimensions.

Illustrative examples of CHA type molecular sieves suitable for use in this invention include SSZ-13, SAPO-34, and SAPO-44. SSZ-13 is an aluminosilicate molecular sieve material prepared as disclosed in U.S. Pat. No. 4,544,538, entitled "Zeolite SSZ-13 And Its Method of Preparation" (U.S. Pat. No. 4,544,538"), the entire disclosure of which is hereby incorporated by reference. Generally, SSZ-13 is a zeolite having a mole ratio of an oxide selected from silicon oxide, germanium oxide, and mixtures thereof to an oxide selected from aluminum oxide, gallium oxide, and mixtures thereof greater than about 5:1 and having the x-ray diffraction lines of Table 1 of U.S. Pat. No. 4,544,538. The zeolite further has a composition, as synthesized and in the anhydrous state, in terms of mole ratios of oxides as follows: (0.5 to 1.4) $R_2O$: (0 to 0.50) $M_2O$:$W_2O_3$; (greater than 5) $YO_2$ wherein M is an alkali metal cation, W is selected from aluminum, gallium, and mixtures thereof, Y is selected from silicon, germanium and mixtures thereof, and R is an organic cation. The organic R is removed typically by calcination at about 280-500° C. As used in this application, "calcinated SSZ-13" refers an SSZ-13 sieve material with organic R removed. SSZ-13 zeolites can have a $YO_2$:$W_2O_3$ mole ratio greater than about 5:1. As prepared, the silica:alumina mole ratio is typically in the range of 8:1 to about 50:1. Higher mole ratios can be obtained by varying the relative ratios of reactants. Higher mole ratios can also be obtained by treating the zeolite with chelating agents or acids to extract aluminum from the zeolite lattice. The silica:alumina mole ratio can also be increased by using silicon and carbon halides and similar compounds. Preferably, SSZ-13 is an aluminosilicate in which W is aluminum and Y is silicon.

Some preferred embodiments remove the alkali metal cation from SSZ-13 and to replace it with hydrogen, ammonium or other desired metal ion. Ion exchange can occur after the organic moiety R is removed, usually by calcination. The hydrogen and sodium forms of SSZ-13, referred to herein respectively as H—SSZ-13 and Na—SSZ-13, are two preferred SSZ-13 molecular sieve materials for use in this invention. H—SSZ-13 can be formed from Na—SSZ-13 by hydrogen exchange or preferably by ammonium exchange followed by heating to about 280-400° C., or in some embodiments, heating to 400-500° C. One sample of H—SSZ-13 was found to have a Si/Al ratio of about 20-24 and Na/Al ratio of less than about 0.3 by electron spectroscopy chemical application ("ESCA") or inductively coupled plasma ("ICP") analysis.

The description and method of preparation of the silicoaluminophosphate molecular sieve materials SAPO-34 and SAPO-44 are found in U.S. Pat. No. 4,440,871, entitled "Crystalline Silicoaluminophosphates," which is hereby incorporated herein by reference. The structure of these molecular sieves is reported by Ashtekar et al., (Journal of Physical Chemistry, V98, N18, May 5, 1994, p. 4878) to be that of the CHA type. SAPO-34 is also identified as having a CHA type structure in the Journal of the American Chemical Society, 106, p. 6092-93 (1984).

In one aspect of this invention, the molecular sieve can be bonded to the continuous phase polymer. The bond provides better adhesion and an interface substantially free of gaps between the molecular sieve particles and the polymer. Absence of gaps at the interface prevents mobile species migrating through the membrane from bypassing the molecular sieve material particles or the polymer. This assures maximum selectivity and consistent performance among different samples of the same molecular sieve/polymer composition.

Bonding of the molecular sieve to the polymer utilizes a suitable binder such as a silane. Any material that effectively bonds the polymer to the surface of the molecular sieve should be suitable as a binder provided the material does not block or hinder migrating species from entering or leaving the pores. Preferably, the binder is reactive with both the molecular sieve and the polymer. The molecular sieve can be pretreated with the binder prior to mixing with the polymer, for example, by contacting the molecular sieve with a solution of a binder dissolved in an appropriate solvent. This step is sometimes referred to as "silanation" of the molecular sieves. Such silanation typically involves heating and holding the molecular sieve dispersed in the binder solution for a duration effective to react the binder with silanol groups on the molecular sieve. In addition, by suitable choice of the reactive functional groups on the binder, the silanated sieve can be further reacted with the polymer. This additional step is referred to here as "sizing". Silanation and sizing are disclosed in U.S. Pat. No. 6,626,980, entitled "Mixed Matrix Membranes Incorporating Chabazite Type Molecular Sieves," the entire disclosure of which is hereby incorporated by reference.

Monofunctional organosilicon compounds disclosed in U.S. Pat. No. 6,508,860, entitled "Gas Separation Membrane With Organosilicon-Treated Molecular Sieve," the entire disclosure of which is hereby incorporated by reference, are one group of preferred binders.

Representative of such monofunctional organosilicon compounds are 3-aminopropyl dimethylethoxy silane (APDMS), 3-isocyanatopropyl dimethylchlorosilane (ICDMS), 3-aminopropyl diisopropylethoxy silane (ADIPS) and mixtures thereof. Thus, as used in this application, "silanated SSZ-13" refers an SSZ-13 sieve material that is treated as described above with a monofunctional organosilicon compound as a binder.

In another aspect of the invention, a molecular sieve material that has been pretreated by a washing method is used. The washing method generally includes treatment by such methods as soaking, steaming, and acidifying prior to adding the molecular sieve material to the suspension. The washing method is disclosed in co-pending U.S. application Ser. No. 11/091,156, entitled, "Novel Method for Forming A Mixed Matrix Composite Membrane Using Washed Molecular Sieve Particles", filed Mar. 28, 2005, the entire disclosure of which is hereby incorporated by reference. Tests have shown that using washed sieve material provides a surprising improvement in both the permeability and selectivity of MMC membranes. Washed molecular sieve material is commercially available from some molecular sieve material suppliers, such as Chevron Research & Technology Company. Thus, as used in this application, "washed SSZ-13" refers to an SSZ-13 sieve material that has been treated by a washing method. One preferred membrane comprises a washed molecular sieve material and a polyimide polymer of the current invention. Preferred washed sieve materials include a washed Na—SSZ-13 molecular sieve material, a washed H—SSZ-13 molecular sieve material, or a mixture of the washed Na—SSZ-13 and washed H—SSZ-13 molecular sieve materials.

The mixed matrix membrane of this invention is formed by uniformly dispersing the molecular sieve particles in the continuous phase polyimide polymer of formula I. This can be accomplished by dissolving the polymer in a suitable solvent and then adding the molecular sieve material, either directly as dry particulates or as a slurry, to the liquid polymer solution to form a concentrated suspension. The slurry medium can be a solvent for the polymer that is either the same or different from that used in polymer solution. If the slurry medium is not a solvent for the polymer, it should be compatible (i.e., miscible) with the polymer solution solvent and it should be added in a sufficiently small amount that will not cause the polymer to precipitate from solution. Agitation and heat may be applied to dissolve the polymer more rapidly or to increase the solubility of the polymer in the solvent. The temperature of the polymer solvent should not be raised so high that the polymer or molecular sieve material is adversely affected. Preferably, solvent temperature during the dissolving step should be about 25 to about 100° C.

The polymer solution should be agitated to maintain a substantially uniform dispersion prior to mixing the slurry with the polymer solution. Agitation called for by this process can employ any conventional high shear rate unit operation such as ultrasonic mixing, ball milling, mechanical stirring with an agitator and recirculating the solution or slurry at high flow through or around a containment vessel.

In another aspect of the invention, the concentrated suspension can be treated with an electrostatically stabilizing additive, referred to herein as an "electrostabilizing additive" to form a stabilized suspension from which the MMC membrane is formed. The electrostabilizing additive may be added to the concentrated suspension while the suspension is agitated.

The electrostatically stabilizing method provides a surprising improvement in the permeability, selectivity, mechanical strength, and consistency of the permeability and selectivity of MMC membranes. This electrostabilizing method is disclosed in U.S. Pat. No. 7,476,636, entitled "Novel Method of Making Mixed Matrix Membranes Using Electrostatically Stabilized Suspensions," the entire disclosure of which is hereby incorporated by reference. Thus, as used in this application, "electrostabilized suspension" refers to a concentrated suspension for forming membranes that has been stabilized by the method of the above application.

Various membrane structures can be formed by conventional techniques known to one of ordinary skill in the art. By way of example, the suspension can be sprayed, cast with a doctor knife, or a substrate can be dipped into the suspension. Typical solvent removal techniques include ventilating the atmosphere above the forming membrane with a diluent gas or drawing a vacuum. Another solvent removal technique calls for immersing the dispersion in a non-solvent for the polymer that is miscible with the solvent of the polymer solution. Optionally, the atmosphere, or non-solvent into which the dispersion is immersed, and/or the substrate can be heated to facilitate removal of the solvent. When the membrane is substantially free of solvent, it can be detached from the substrate to form a self-supporting structure or the membrane can be left in contact with a supportive substrate to form an integral composite assembly. In such a composite, preferably the substrate is porous or permeable to gaseous components that the membrane is intended to separate. Further, optional fabrication steps include washing the membrane in a bath of an appropriate liquid to extract residual solvent and other foreign matter from the membrane and drying the washed membrane to remove residual liquid.

One preferred embodiment of the current invention forms an asymmetric membrane. As used herein, an "asymmetric membrane" refers to a fluid separation membrane which is generally prepared in one step, and that typically, but not necessarily, comprises a dense separating layer supported on an anisotropic substrate of a graded porosity that are generally prepared in one step. As used herein, an "asymmetric film" refers to the dense separation layer of the asymmetric membrane. Methods of forming asymmetric film membranes are known by one of ordinary skill in the art. An asymmetric membrane may be either an asymmetric film membrane or a hollow fiber membrane. One preferred method of making asymmetric membranes is described in detail in U.S. Pat. No. 5,468,430, entitled "Process of Making Multicomponent or Asymmetric Gas Separation Membranes," the entire disclosure of which is hereby incorporated by reference.

The ratio of molecular sieve material to polymer in the membrane can be within a broad range. Enough continuous phase should be present to maintain the integrity of the mixed matrix composite. For this reason, the molecular sieve material usually constitutes at most about 100 weight parts of molecular sieve per 100 weight parts of polymer (or 100 wt. % molecular sieve based on polymer, also referred to as "wt. % bop"). It is desirable to maintain the respective concentration of polymer in solution and molecular sieve particles in suspension at values which render these materials free flowing and manageable for forming the membrane. Preferably, the molecular sieve material in the membrane should be about 5 wt. % bop to about 50 wt. % bop, and more preferably about 10 to about 30 wt. % bop.

The solvent utilized for dissolving the polymer to form the suspension medium and for dispersing the molecular sieve particles in suspension is chosen primarily for its ability to completely dissolve the polymer and for ease of solvent removal in the membrane formation steps. Common organic solvents that are typically used for the formation of polyimide membranes include aprotic solvents such as N-methylpyrrolidone ("NMP"), and N,N-dimethyl acetamide ("DMAC"). Other solvents such as tetramethylene sulfone or salt additives may also be added to the polymer solution.

The current invention includes a method of separating one or more fluids from a fluid mixture comprising the steps of:
(a) providing a fluid separation membrane of the current invention; and
(b) contacting a fluid mixture with a first side of the fluid separation membrane thereby causing a preferentially permeable fluid of the fluid mixture to permeate the fluid separation membrane faster than a less preferentially permeable fluid to form a permeate fluid mixture enriched in the preferentially permeable fluid on a second side of the fluid separation membrane, and a retentate fluid mixture depleted in the preferentially permeable fluid on the first side of the fluid separation membrane, and
(c) withdrawing the permeate fluid mixture and the retentate fluid mixture separately.

The novel MMC membranes of the current invention can operate under a wide range of conditions and thus are suitable for use in processing feed streams from a diverse range of sources. For example, membranes of the current invention are particularly suitable for separating oxygen, carbon dioxide, or helium from nitrogen, or streams containing hydrocarbons. The membranes resist plasticizing, and thus are also suitable for use where the process stream contains materials that interact with membrane polymers, such as condensable hydrocarbons or organic solvents. Thus, one preferred method feeds a fluid mixture to the fluid separation membrane that comprises carbon dioxide and methane. Another preferred method feeds a fluid mixture to the fluid separation membrane that comprises helium and a hydrocarbon. Another preferred embodiment separates oxygen from nitrogen.

MMC film membranes prepared from the polyimide polymers of the current invention show surprisingly enhanced permeation performance, particularly selectivity, relative to neat dense film membranes made of the same polymer. The selectivity of MMC membranes made with the polyimide polymers, particularly asymmetric membranes, is particularly suitable for the separation of oxygen and nitrogen, and the separation of carbon dioxide from nitrogen or hydrocarbon streams. Furthermore, the selectivity of MIMC membranes of the current invention is surprisingly good for the separation of helium and nitrogen. Preferred embodiments are also resistant to interaction with streams containing hydrocarbons or contaminants that reduce the separation performance of the membrane. Finally, the separation performance of MMC membranes, particularly asymmetric MMC membranes, of the current invention show surprisingly consistent separation performance between various MMC film samples. Thus, MMC membranes of the current invention are well suited for a number of process applications, and particularly for use in oxygen/nitrogen production processes, and natural gas processes.

EXAMPLES

This invention is now illustrated by examples of certain representative, non-limiting embodiments thereof.

Dense Films

Neat and MMC P84 dense films with approximately 15% SSZ-13 loading were tested with $O_2$, $CO_2$, He, and $N_2$ pure gases at approximately 50 psi transmembrane pressure and temperatures of 35-50° C. The films were knife-cast from ~20% solutions in NMP on glass plates heated to 80° C. Films were removed from the glass plates after ~40 hours and then dried in vacuum ovens at ~120° C. for 7-10 days before testing. Scanning electron microscope (SEM) showed good adhesion between the APDMS silanated SSZ-13 particles and the P84 matrix. As shown in Table 1, reproducible improvements were seen for MMC dense film membrane coupons.

TABLE 1

Pure Gas Permeabilities for Neat and MMC P84 + 15% SSZ-13 Dense Films

| P84 | Temp. C. | Sample # | Permeability Barrier | | | | Selectivity | | |
|---|---|---|---|---|---|---|---|---|---|
| | | | $O_2$ | $N_2$ | $CO_2$ | He | $O_2/N_2$ | $CO_2/N_2$ | $He/N_2$ |
| Neat | 35 | 1 | 0.48 | 0.070 | 1.80 | 9.4 | 6.92 | 25.9 | 136 |
| | | 2 | 0.37 | 0.055 | | | 6.71 | | |
| | | 3 | 0.36, 0.47 | 0.05, 0.07 | | | ~6.8 | | |
| | | 4 | 0.41 | 0.059 | 1.50 | 7.7 | 6.84 | 25.3 | 130 |
| | | 5 | 0.38 | 0.060 | 1.49 | 7.3 | 6.42 | 25.0 | 122 |
| | | Avg | 0.41 | 0.061 | 1.60 | 8.1 | 6.72 | 25.4 | 129 |
| +15% HSSZ13 (2814-03) | 35 | 6 | 0.47 | 0.065 | 1.95 | 11.9 | 7.27 | 30.0 | 183 |
| | | 7 | 0.48 | 0.059 | 1.77 | 12.2 | 8.15 | 30.3 | 209 |
| | | 8 | 0.51 | 0.069 | 2.09 | 13.5 | 7.37 | 30.5 | 197 |
| | | 9 | 0.49 | 0.068 | 1.89 | 12.1 | 7.27 | 27.9 | 178 |
| | | Avg | 0.49 | 0.065 | 1.93 | 12.4 | 7.51 | 29.7 | 192 |
| | | Increase | 19% | 6% | 21% | 53% | 12% | 17% | 48% |
| Neat | 50 | 10 | | 0.112 | 2.10 | 13.4 | | 18.8 | 120 |
| | | 11 | | 0.094 | 1.98 | 10.3 | | 21.1 | 109 |
| | | 12 | | 0.100 | 1.96 | 9.9 | | 19.7 | 99 |
| | | Avg | | 0.102 | 2.01 | 11.2 | | 19.8 | 109 |
| +15% HSSZ13 (2814-03) | 50 | 13 | | 0.107 | 3.08 | 13.1 | | 28.8 | 122 |
| | | 14 | | 0.072 | 2.43 | 15.9 | | 33.8 | 221 |
| | | 15 | | 0.103 | 2.62 | 17.9 | | 25.5 | 174 |
| | | 16 | | 0.096 | 2.37 | 15.9 | | 24.8 | 166 |
| | | Avg | | 0.094 | 2.63 | 15.7 | | 28.2 | 171 |
| | | Increase | | −7% | 30% | 40% | | 42% | 56% |

The P84 MMC dense film membranes showed an appreciable improvement in permeation performance over the neat P84 dense film membranes. Surprisingly, the P84 MMC dense film membranes also showed very consistent permeation performance.

Comparative Dense Film Example:

MMC dense film membranes made with Ultem or Matrimid polymer, which represents the state of the art prior to the current invention, typically show a larger degree of variation in permeation data. MMC film samples made with 15% SSZ-13 with a Matrimid matrix were produced and tested. Only one in three of the film samples showed a clear MMC effect, as defined by an increase in O2/N2 selectivity of >5% over the neat polymer value (O2/N2~6.8). MMC samples made with 15% SSZ-13 in an Ultem matrix were also produced and tested. Only four out of eight film coupons showed a clear MMC effect, as defined by an increase in O2/N2 selectivity of >5% over the neat polymer value (O2/N2~7.6). By contrast, all MMC film samples made with P84 using the same production techniques showed a clear MMC selectivity enhancement.

Asymmetric Films

Asymmetric films typical of the current invention were cast from a solution of 22-24% P84 in NMP with 15% (wt, bop) of SSZ-13. The films were dehydrated by a simple one-rinse i-PrOH exposure, air-dried and post-treated to seal defects with 2% 2577 in iso-octane. The film preparation conditions are listed in Table 2.

TABLE 2

Preparation Parameters for Asymmetric MMC Film based on P84 + molecular sieves corresponding to permeation data in Tables 3-5

| Sample | Zeolite dried 180 C. | % zeolite | % P84 soln | Plate ° C./ knife mils | Drying ° C. |
|---|---|---|---|---|---|
| A | Silanated | 15% | 24 | 92/15 | 90 |
| B | SSZ-13 | 15% | 24 | 92/15 | 90 |
| C | NH$_4$-exchanged | 15% | 24 | 92/15 | 90 |
| D | and calcined | 15% | 24 | 92/15 | 135 |
| E | Water-washed SSZ-13 | 14.9% | 22.7 | 102/15 | 75 |
| F | Water-washed SSZ-13 | 30.4% | 22.8 | 102/15 | 75 |
| G | CMS Westvaco | 17.6% | 22.4 | 102/15 | 75 |
| H | SAPO-34 | 15.1% | 19.4 | 95/30 | 75 |
| Common Conditions | 70 C. solution 30 s evap/water pptn 30 min/1 rinse i-PrOH 30 min Dried overnight before convection oven Post-treated in cell with Sylgard 3-1753 | | | | |

Asymmetric film samples were made with P84 polyimide and silanated SSZ-13 (un-washed), then tested with $CO_2$/$CH_4$ mixed gases (10% $CO_2$, 315 psia) at 35° C. Two samples showed a MMC selectivity enhancement versus neat dense P84 films as shown in Table 3.

TABLE 3

CO2/CH4 selectivity for P84 + silanated SSZ-13 asymmetric films in comparison to selectivity for neat P84 dense films

| | 10% CO2 in CH4, 315 psi | |
|---|---|---|
| P84 + 15% SSZ-13 asymmetric film Sample # | 35 C. CO2/CH4 | 50 C. CO2/CH4 |
| C-2 | 66 | 50 |
| D-2 | 53 | 40 |
| P84 neat dense films (Average) | 47 | 36 |

As shown in Table 3, the neat P84 dense film membrane samples tested under the same conditions showed a CO$_2$/CH$_4$ selectivity of 47 at 35° C. Clearly, MMC P84 asymmetric film membranes show an improved $CO_2/CH_4$ selectivity over the intrinsic selectivity achieved in P84 dense film membranes.

Asymmetric MMC films based on P84 were also made with both washed Na—SSZ-13 as well as ammonium exchanged and calcined silanated SSZ-13. These films were tested with $CO_2/N_2$ mixed gas (10 and 20% $CO_2$, about 235 psia) at 50° C.

TABLE 4

CO2/N2 selectivity at 50° C. for P84 + SSZ-13 asymmetric films using washed and unwashed SSZ-13 sieve samples

| Sample | Mol sieve material | CO2 feed | CO2/N2 | CO2 GPU |
|---|---|---|---|---|
| B-1 | Silanated SSZ-13 | 20.0% | 24.6 | 13 |
| G-1 | Water-washed & silanated | 10.6% | 22.9 | 13 |
| I-1 |  | 10.6% | 27.4 | 49 |
| I-2 | SSZ-13 | 10.6% | 28.7 | 78 |

By comparison, P84 neat dense film membranes show $CO_2/N_2$ selectivity at 50° C. of about 20 (Table 1). Thus, P84/SSZ-13 asymmetric film coupons showed surprising and significant $CO_2/N_2$ selectivity improvement compared to neat dense film membranes. The P84 MMC asymmetric film improvement ranged from 27 to 60% over P84 neat dense films.

Asymmetric film samples were also made using other molecular sieves, including SAPO-34, and carbon molecular sieve ("CMS") obtained from Westvaco). The results of $CO_2/N_2$ selectivity at 50° C. are shown in Table 5. These P84 MMC asymmetric film based on CMS show increased selectivity of 40% over P84 neat dense films. This illustrates that the good MMC forming capabilities of P84 are not restricted to SSZ-13 but also apply to other types of molecular sieves. Thus, useful MMC membranes based on P84 matrix polymers can be prepared with various aluminosilicate, silico-aluminophosphate and carbon based molecular sieves.

TABLE 5

CO2/N2 selectivity at 50° C. for P84 MMC asymmetric films using SAPO-34 and carbon molecular sieve samples

| Sample | Mol sieve material | CO2 feed | CO2/N2 | CO2 GPU |
|---|---|---|---|---|
| F-1 | SAPO-34 | 10.60% | 20.2 | 9 |
| H-1 | CMS | 10.60% | 25.5 | 6 |

Comparative Asymmetric Film Example:

Several prior art examples of asymmetric films were made with Ultem and Matrimid polymer and SSZ-13 molecular sieve material. The asymmetric membranes were cast from control films using solutions as well as zeolite containing suspensions in the same solutions. The casting parameters were kept constant and correspond to the conditions for samples B & C in Table 2.

Testing with O2/N2 and CO2/CH4 showed that various asymmetric MMC film samples made with Ultem and silanated SSZ-13 did not even reach the intrinsic selectivity of the corresponding neat Ultem film (O2/N2~7.8-8.0 at 20° C.). These permeation results are shown in Table 6 below.

TABLE 6

O2/N2 selectivity at 20° C. for Ultem + silanated SSZ-13 MMC asymmetric films

| O2 GPU | O2/N2 |
|---|---|
| 5.1 | 6.2 |
| 3.1 | 5.3 |
| 5.2 | 6.5 |
| 3.0 | 6.9 |
| 3.1 | 7.2 |

The best Ultem+silanated SSZ-13 asymmetric film (O2/N2~7.2) was also tested with CO2/CH4 at 50° C. (test conditions corresponding to Table 3). The asymmetric MMC film had a CO2/CH4 selectivity of 21.8 which is also less that measured for the corresponding neat polymer film.

Similarly, MMC asymmetric films based on Matrimid polymer did not show any selectivity enhancement versus neat dense films. In two cases, silanated SSZ-13 was coated with a polymer sizing, one of Matrimid and the other Ultem. A SAPO-44 sample was also studied. Permeation results are shown in Table 7.

TABLE 7

Matrimid based MMC Asymmetric Film Results

| Matrimid MMC Film | Temperature ° C. | $O_2$ GPU | $O_2/N_2$ |
|---|---|---|---|
| +15% SSZ-13 Silanated and Matrimid sized, | 35° C. | 12.3 | 5.72 |
| +16% SSZ-13 Silanated and Ultem sized | 35° C. | 19.3 | 6.1 |
| +15% SAPO 44 | 20° C. | 3-5 | 6.95 |

Matrimid dense films have been shown to have a selectivity of 6.3 to 6.8 at 35° and 6.9 to 7.1 at ambient temperature. Thus, Matrimid asymmetric mixed matrix films have selectivities that are 0-15% less than the neat dense film values.

Hydrocarbon Exposure Tests

Testing also shows that P84 MMC membranes are resistant to decreased performance due to interactions with hydrocarbons. A P84/SSZ-13 MMC asymmetric film was tested with 10% $CO_2$ in $CH_4$ at 50° C. and 315 psia. The film had a $CO_2$ permeance of 4 GPU and $CO_2/CH_4$ selectivity of 50. The film was then exposed to 10% $CO_2$+10% n-butane in $CH_4$ at 50° C. and 150-200 psig for 4 days. The film's performance was measured again with 10% $CO_2$ in $CH_4$ at 50° C. and 315 psia. The asymmetric film performance was unchanged.

Although the present invention has been described in considerable detail with reference to certain preferred versions and examples thereof, other versions are possible. Therefore, the spirit and scope of the appended claims should not be limited to the description of the preferred versions contained herein.

What is claimed is:

1. A method of producing a fluid separation membrane, said method comprising the steps of:
   (a) providing a polyimide polymer that comprises a plurality of first repeating units of a formula (I), wherein said formula (I) is:

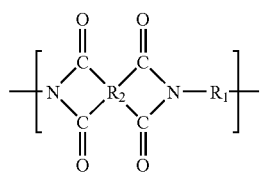
(I)

in which $R_1$ of said formula (I) is a moiety having a composition selected from the group consisting of a formula (A), a formula (B), a formula (C), and mixtures thereof, wherein said formula (A), said formula (B), and said formula (C) are:

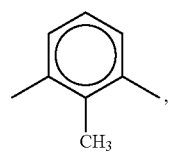
(A)

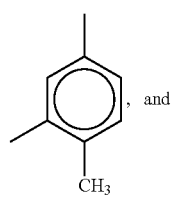
(B)

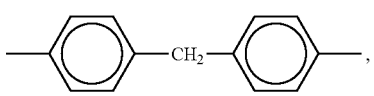
(C)

and in which $R_2$ of said formula (I) is a moiety having a composition selected from the group consisting of a formula (Q), a formula (S), a formula (T), and mixtures thereof, wherein said formula (Q), said formula (S), and said formula (T) are:

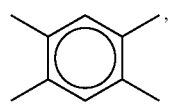
(Q)

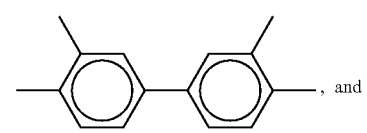
(S)

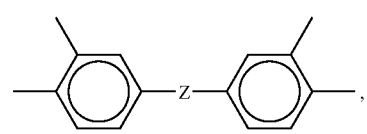
(T)

in which Z of said formula (T) is a moiety having a composition selected from the group consisting of a formula (L), a formula (M), a formula (N), and mixtures thereof, wherein said formula (L), said formula (M), and said formula (N) are:

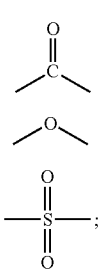
(L)
(M)
(N)

(b) providing a molecular sieve material;

(c) synthesizing a concentrated suspension, wherein said concentrated suspension comprises a solvent, said polyimide polymer, and said molecular sieve material dispersed therein; and (d) forming a membrane, wherein the molecular sieve material is dispersed within a continuous phase of the polyimide polymer.

2. The method of claim 1, wherein said polyimide polymer is an annealed polyimide polymer.

3. The method of claim 1, wherein said moiety $R_1$ has a composition of:

a) said formula (A) in about 10-25% of said first repeating units;

b) said formula (B) in about 55-75% of said first repeating units; and c) said formula (C) in about 20-40% of said first repeating units.

4. The method of claim 1, wherein said polyimide polymer is about 20 to about 25% by weight of said concentrated suspension.

5. The method of claim 1, further comprising the step of treating the molecular sieve with a binder prior to synthesizing the concentrated suspension.

6. The method of claim 1, further comprising the step of washing the molecular sieve prior to synthesizing the concentrated suspension.

7. The method of claim 1, wherein said molecular sieve material is selected from the group consisting of aluminosilicate molecular sieve, silicalite molecular sieve, silico-alumino-phosphate molecular sieve, aluminophosphate molecular sieve, carbon-based molecular sieve, and mixtures thereof.

8. The method of claim 1, wherein said molecular sieve material is about 10 to 20% by weight of said concentrated suspension.

9. The method of claim 8, wherein said forming step forms an asymmetric film membrane.

10. The method of claim 8, wherein said forming step forms a hollow fiber membrane.

11. A method of separating a fluid from a fluid mixture comprising the steps of:

(a) providing a fluid separation membrane having a molecular sieve material dispersed in a continuous phase of a polyimide polymer, wherein said polyimide polymer comprises a plurality of first repeating units of a formula (I), wherein said formula (I) is:

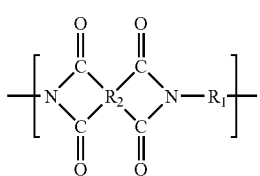
(I)

in which $R_1$ of said formula (I) is a moiety having a composition selected from the group consisting of a formula (A), a formula (B), a formula (C), and mixtures thereof, wherein said formula (A), said formula (B), and said formula (C) are:

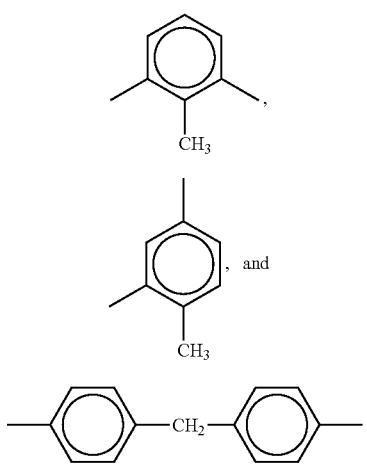

(A)

(B)

(C)

and in which $R_2$ of said formula (I) is a moiety having a composition selected from the group consisting of a formula (Q), a formula (S), a formula (T), and mixtures thereof, wherein said formula (Q), said formula (S), and said formula (T) are:

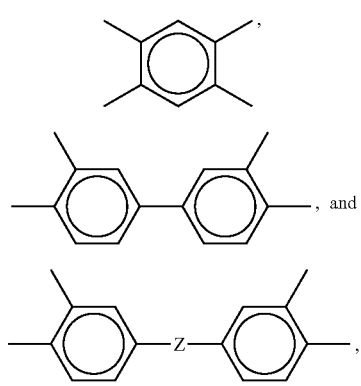

(Q)

(S)

(T)

in which Z of said formula (T) is a moiety having a composition selected from the group consisting of a formula (L), a formula (M), a formula (N), and mixtures thereof, wherein said formula (L), said formula (M), and said formula (N) are:

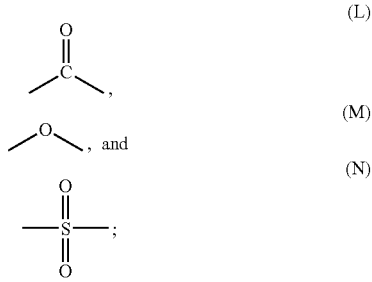

(L)

(M)

(N)

(b) contacting a fluid mixture with a first side of said membrane thereby causing a preferentially permeable fluid of said fluid mixture to permeate said membrane faster than a less preferentially permeable fluid to form a permeate fluid mixture enriched in said preferentially permeable fluid on a second side of said membrane and a retentate fluid mixture depleted in said preferentially permeable fluid on said first side of said membrane; and (c) withdrawing said permeate fluid mixture and said retentate fluid mixture separately, wherein the pressure gradient across said membrane is in a range of about 100 to about 2000 psi.

12. The method of claim 11, wherein said fluid separation membrane is a hollow fiber membrane.

13. The method of claim 11 wherein said fluid separation membrane is an asymmetric film membrane.

14. The method of claim 11, wherein said moiety $R_1$ has a composition of:
  a) said formula (A) in about 10-25% of said first repeating units;
  b) said formula (B) in about 55-75% of said first repeating units; and
  c) said formula (C) in about 20-40% of said first repeating units.

15. The method of claim 11, wherein said polyimide polymer makes up about 20 to about 80% of the membrane by weight.

16. The method of claim 11, wherein said molecular sieve material is selected from the group consisting of aluminosilicate molecular sieve, silicalite molecular sieve, silico-alumino-phosphate molecular sieve, alumino-phosphate molecular sieve, carbon-based molecular sieve, and mixtures thereof.

17. The method of claim 11, wherein said pressure gradient across said membrane is in the range of about 1000 to about 2000 psi.

18. The method of claim 11, wherein said fluid mixture comprises carbon dioxide and a gas selected from the group consisting of methane, nitrogen, and mixtures thereof.

19. The method of claim 11, wherein said fluid mixture comprises oxygen and a gas selected from the group consisting of methane, nitrogen, and mixtures thereof.

20. The method of claim 11, wherein said fluid mixture comprises helium and a gas selected from the group consisting of methane, oxygen, nitrogen, and mixtures thereof.

* * * * *